(12) United States Patent
Hayashi (10) Patent No.: US 8,084,973 B2
(45) Date of Patent: Dec. 27, 2011

(54) MOTOR DRIVING CIRCUIT (75) Inventor: Hiroaki Hayashi, Kyoto (JP)

(73) Assignee: Rohm Co., Ltd. (JP)

(*) Notice: Subject to any disclaimer, the term of this patent is extended or adjusted under 35 U.S.C. 154(b) by 494 days.

(21) Appl. No.: 12/161,912

(22) PCT Filed: Jan. 22, 2007

(86) PCT No.: PCT/JP2007/000024
§ 371 (c)(1),
(2), (4) Date: Jul. 23, 2008

(87) PCT Pub. No.: WO2007/083524
PCT Pub. Date: Jul. 26, 2007

(65) Prior Publication Data
US 2009/0066280 A1 Mar. 12, 2009

(30) Foreign Application Priority Data
Jan. 23, 2006 (JP) ................................. 2006-014448

(51) Int. Cl.
*H02H 7/09* (2006.01)
(52) U.S. Cl. .................... 318/400.22; 318/599; 318/811; 388/804; 388/829
(58) Field of Classification Search ............. 318/400.01, 318/400.09, 430, 432, 434, 599, 799, 811, 318/400.06, 400.22, 779, 812; 388/804, 388/811, 829
See application file for complete search history.

(56) References Cited

U.S. PATENT DOCUMENTS

| | | | | |
|---|---|---|---|---|
| 5,847,523 A | * | 12/1998 | Rappenecker et al. | ....... 318/434 |
| 5,883,489 A | * | 3/1999 | Konrad | ......... 318/807 |
| 6,016,965 A | * | 1/2000 | Yoshimura et al. | ............ 236/35 |
| 6,967,459 B2 | * | 11/2005 | Hahn et al. | ..................... 318/599 |
| 7,030,584 B1 | * | 4/2006 | Alberkrack | ............. 318/400.03 |

(Continued)

FOREIGN PATENT DOCUMENTS

JP 62-081991 A 4/1987

(Continued)

OTHER PUBLICATIONS

International Search Report for International Application No. PCT/JP2007/000024; Date of mailing Apr. 24, 2007; with English translation.

(Continued)

*Primary Examiner* — Walter Benson
*Assistant Examiner* — Antony M Paul
(74) *Attorney, Agent, or Firm* — Cantor Colburn LLP (57) ABSTRACT

A motor driving circuit generates pulse driving signals, and controls the ON/OFF state of a switching circuit connected to a coil of a motor which is to be driven, thereby controlling the conduction period of the motor. A driving signal generating circuit generates the driving signals such that they are pulse modulated according to the torque target value for the motor, and outputs the driving signals to the switching circuit. A current detection circuit detects the current flowing through the coil of the motor. A current limiting circuit controls the logical values of the driving signals generated by the driving signal generating circuit such that the current detected by the current detection circuit does not exceed a predetermined current upper limit. The current limiting circuit increases the current upper limit according to the time elapsed in the starting operation of the motor. After the starting operation of the motor, the current upper limit is set to a predetermined fixed value.

5 Claims, 3 Drawing Sheets

U.S. PATENT DOCUMENTS

| | | | |
|---|---|---|---|
| 7,064,510 B2* | 6/2006 | Brannen et al. | 318/400.3 |
| 7,148,642 B2* | 12/2006 | Brannen et al. | 318/400.06 |
| 7,233,121 B2* | 6/2007 | Wu et al. | 318/400.17 |
| 7,276,867 B2* | 10/2007 | Alberkrack et al. | 318/400.24 |
| 7,365,508 B2* | 4/2008 | Iribe et al. | 318/568.12 |
| 7,747,146 B2* | 6/2010 | Milano et al. | 388/811 |
| 2004/0081438 A1* | 4/2004 | Hahn et al. | 388/804 |
| 2004/0155616 A1 | 8/2004 | Iribe et al. | |

FOREIGN PATENT DOCUMENTS

| | | |
|---|---|---|
| JP | 04-197096 A | 7/1992 |
| JP | 07-095792 A | 4/1995 |
| JP | 2001-045790 A | 2/2001 |
| JP | 2004-201485 A | 7/2004 |
| JP | 2004-364408 A | 12/2004 |
| JP | 2005-245175 A | 9/2005 |

OTHER PUBLICATIONS

International Preliminary Report on Patentability for International Application No. PCT/JP2007/000024; Date of issuance Jul. 29, 2008; with English translation.

Chinese Office Action for Application No. 20070000203.9 issued Mar. 11, 2010 with English translation.

Japanese Office Action, Notification of Reason(s) for Refusal for Japanese Patent Application No. 2006-014448 mailing date of Aug. 2, 2011 with English Translation.

* cited by examiner

Icoil, Imax

FIG.3

MOTOR DRIVING CIRCUIT

CROSS REFERENCE TO RELATED APPLICATIONS

This is a U.S. national stage of application No. PCT/JP2007/000024, filed on 22 Jan. 2007. Priority under 35 U.S.C. §119(a) and 35 U.S.C. §365(b) is claimed from Japanese Application No. 2006-014448, filed 23 Jan. 2006, the disclosure of which is also incorporated herein by reference.

BACKGROUND OF THE INVENTION

1. Field of the Invention

The present invention relates to a motor driving technique, and particularly to a technique for controlling the starting of a motor.

2. Description of the Related Art

There is a widely used technique in which the conduction period (ON time) for each coil of a motor is controlled according to a pulse signal such as a pulse width modulation signal or the like, in order to rotationally drive a single-phase motor, or a multi-phase motor, with a desired torque.

Let us consider a case of starting to drive a motor that has stopped. In this case, in a case that a switching voltage is suddenly applied to each coil of the motor, with a pulse width that corresponds to a desired target torque, a rapid increase occurs in the current flowing through the coil of the motor. When the motor is started, and, in particular, in a case that the revolution is close to zero, the motor provides no power generation function. Accordingly, in this case, the value of the current flowing through the coil is obtained by dividing the voltage thus applied by the winding resistance. On the other hand, the resistance value of each coil is set to an extremely low value, which is designed in order to reduce the power loss. Accordingly, in some cases, with such an arrangement, the coil current exceeds the rated current of the driving circuit or the rated current of the coil itself, leading to the reliability of the circuit being adversely affected.

On the other hand, the counter electromotive voltage generated by each coil is proportional to the rate of change in the current flowing through the coil over time. Accordingly, in a case that a rapid increase occurs in the coil current as described above, an extremely large counter electromotive voltage is generated, which can exceed the rated voltage of the driving circuit.

For such a reason, soft start control is employed in which current control is performed such that the amount of current flowing through the coil is gradually increased immediately after the motor is started (see Patent documents 1 and 2, for example). With the soft start control described in Patent document 1, first, a soft start voltage is generated, the voltage value of which is gradually increased over time. Then, a comparison is made between the soft start voltage thus generated and a triangle wave or sawtooth wave cyclic voltage so as to generate a pulse modulation signal with a duty ratio that gradually increases over time. Such an arrangement provides the conduction period that gradually increases over time for each coil, thereby offering the soft start control.

[Patent Document 1]
 Japanese Patent Application Laid-Open No. Hei 07-95792
[Patent Document 2]
 Japanese Patent Application Laid-open No. 2001-45790

SUMMARY OF THE INVENTION

The present invention has been made in order to provide the soft start control for the duration of the starting of a motor, in the same way as with the techniques described in Patent documents 1 and 2. It is a general purpose of the present invention to provide a motor driving circuit which provides the soft start control using a new technique that differs from those of conventional techniques.

The invention will now be described based on preferred embodiments which do not intend to limit the scope of the present invention but exemplify the invention. All of the features and the combinations thereof described in the embodiment are not necessarily essential to the invention.

An embodiment of the present invention relates to a motor driving circuit which generates pulse driving signals so as to control the ON/OFF state of a switching circuit connected to a coil of a motor to be driven, thereby controlling the conduction period of the motor. The motor driving circuit comprises: a driving signal generating circuit which generates the driving signals such that they are pulse modulated according to a torque target value for the motor, and which outputs the driving signals thus generated to the switching circuit; a current detection circuit which detects a current flowing through the coil of the motor; and a current limiting circuit which controls the logical values of the driving signals generated by the driving signal generating circuit such that a current detected by the current detection circuit does not exceed a predetermined current upper limit. With such an arrangement, the current limiting circuit increases the current upper limit according to the time elapsed in the starting operation of the motor.

With such an arrangement, the current flowing through the coil of the motor is controlled so as to be not more than the current upper limit. In the starting operation, such an arrangement gradually increases the current upper limit, which gradually increases the current flowing through the coil of the motor that has such a current upper limit, thereby providing soft start control.

Also, the current limiting circuit may set the current upper limit to a predetermined fixed value after the starting operation of the motor. After the starting operation, such an arrangement limits the current flowing through the coil of the motor that has the aforementioned current upper limit, thereby protecting the circuit.

Also, an arrangement may be made in which the current limiting circuit includes a detection resistor, one terminal of which is set to a fixed electric potential, the detection resistor being provided on a path for the current that flows through the coil of said motor and said switching circuit; and outputs a voltage drop generated at the detection resistor as a detection voltage that corresponds to the current flowing through the coil of the motor. With such an arrangement, the current limiting circuit compares the detection voltage with an upper limit voltage which is set according to the current upper limit, controls the logical values of the driving signals such that the detection voltage does not exceed the upper limit voltage, and increases the upper limit voltage in the starting operation of the motor.

Also, the current limiting circuit may include a comparator which compares the detection voltage with the upper limit voltage. With such an arrangement, in a case that the detection voltage exceeds the upper limit voltage, each of the logical values of the driving signals generated by the driving signal generating circuit is set to a fixed value so as to instruct the switching circuit to stop the supply of current to the motor, following which the fixed logical values thus set are released at a predetermined timing.

In a case that the current flowing through the coil reaches the current upper limit, such an arrangement stops the supply of current to the coil of the motor during a period before the predetermined timing at which the fixed logical values are released. Such an arrangement prevents the current flowing through the coil from exceeding the current upper limit.

Also, the current limiting circuit may further include a release signal generating unit which generates a release signal that is set to a predetermined level, synchronously with the driving signals generated by the driving signal generating circuit. With such an arrangement, in a case that the release signal generated by the release signal generating unit switches to the aforementioned predetermined level, the fixed logical values of the driving signals are released. With an arrangement in which the motor is switching driven (pulse driven), spike noise can occur in the current flowing through the coil of the motor at a timing of the switching operation according to the driving signals. In some cases, such noise leads to the detection voltage exceeding the upper limit voltage, which leads to a problem of erroneous detection of the over current state. With the above-described embodiment, the fixed state of the logical values of the driving signals is released according to a release signal generated synchronously with the driving signals. Such an arrangement suppresses the influence of noise on the motor rotation control.

The current limiting circuit may include: a first comparator which compares the detection voltage with a cycle voltage; a second comparator which compares the upper limit voltage with the cycle voltage; and a combining unit which combines the output signals output from the first comparator and the second comparator by logical operation, thereby generating a limit pulse signal. The driving signal generating circuit may limit the duty ratio of the driving signals, which are to be output to the switching circuit, based upon the duty ratio of the limit pulse signal.

The current limiting circuit may include: a difference amplifier which compares the detection voltage with the upper limit voltage, and which amplifies and outputs the difference between these two voltages; and a limiting comparator which compares the voltage difference output from the difference amplifier with a predetermined cycle voltage, and which generates a limit pulse signal having a pulse width that determines the upper limit or the lower limit of the pulse width of the driving signals. The driving signal generating circuit may limit the duty ratio of the driving signals, which are to be output to the switching circuit, based upon the duty ratio of the limit pulse signal.

Also, the motor driving circuit may be integrally formed on a single semiconductor substrate. Examples of arrangements "integrally formed" include: an arrangement in which all the components of a circuit are formed on a semiconductor substrate; and an arrangement in which principal components of a circuit are integrally formed. With such an arrangement, a part of the resistors, capacitors, and so forth, for adjusting circuit constants, may be provided in the form of components external to the semiconductor substrate. With such an arrangement, the motor driving circuit is integrally formed in the form of a single LSI, thereby reducing the circuit area.

Another embodiment of the present invention relates to a cooling apparatus. The cooling apparatus includes a fan motor; and the above-described motor driving circuit which drives the fan motor.

Yet another embodiment of the present invention relates to an electronic apparatus. The electronic apparatus includes the above-described cooling apparatus. Such an arrangement enables the interior of the electronic apparatus to be properly cooled so as to be a suitable temperature.

Yet another embodiment of the present invention relates to a motor driving method for generating pulse driving signals so as to control the ON/OFF state of a switching circuit connected to a coil of a motor to be driven, thereby controlling the conduction period of the motor. The motor driving method comprises: generating driving signals pulse such that they are pulse modulated according to a torque target value for the motor, and outputting the driving signals thus pulse modulated to the switching circuit; detecting a current flowing through the coil of the motor; and controlling the logical values of the driving signals such that the detected current does not exceed a current upper limit which is increased according to the time elapsed in the starting operation of the motor.

It is to be noted that any arbitrary combination or rearrangement of the above-described structural components and so forth is effective as and encompassed by the present embodiments.

Moreover, this summary of the invention does not necessarily describe all necessary features to that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

An embodiment of the present invention relates to a motor driving circuit employed in electronic computers such as desktop or notebook-sized personal computers, workstations, and so forth, and cooling apparatuses such as refrigerators for cooling electronic equipment.

Figure 1:
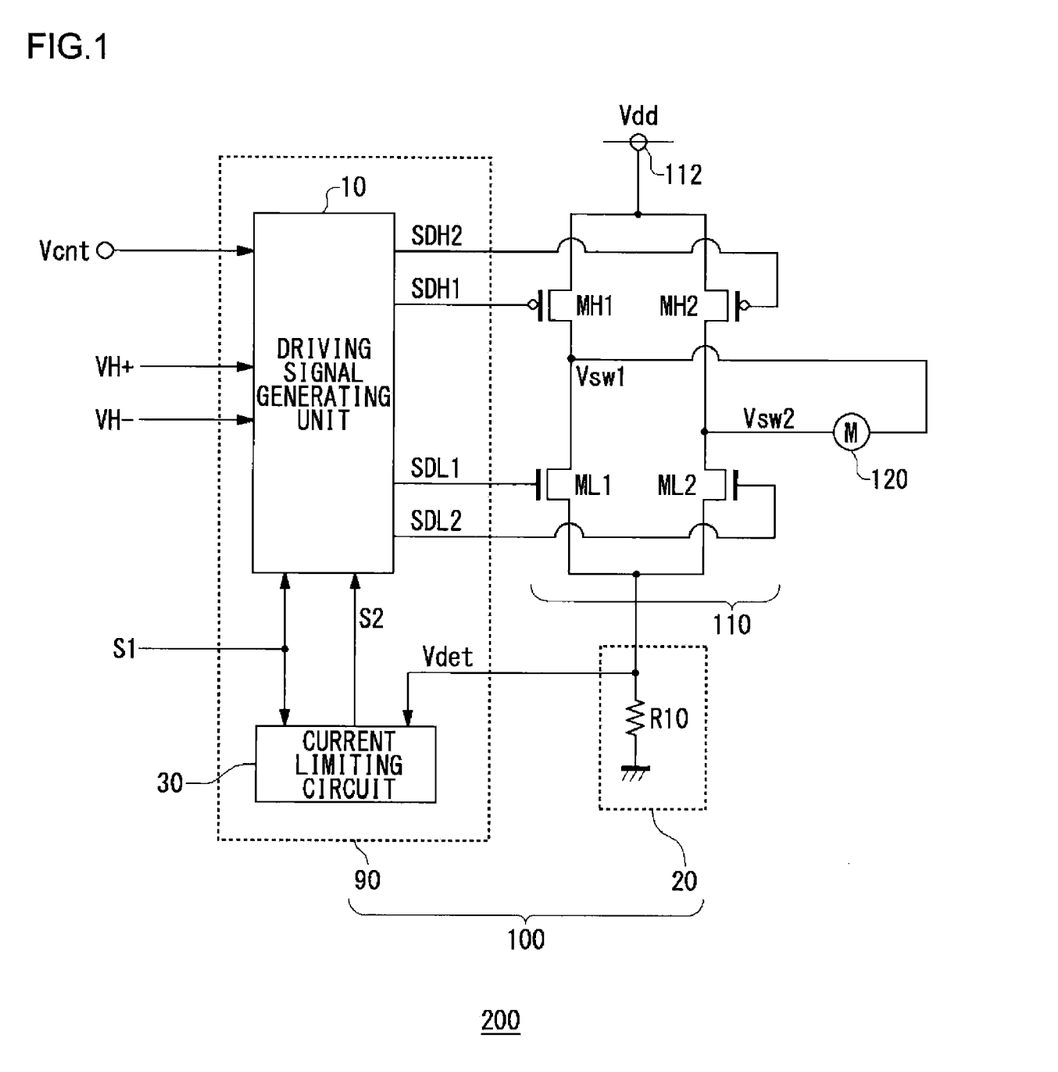
FIG. 1 is a circuit diagram which shows a configuration of a cooling apparatus employing a motor driving circuit according to an embodiment of the present invention.

FIG. 1 is a circuit diagram which shows a configuration of a cooling apparatus 200 according to an embodiment of the present invention. The cooling apparatus 200 includes a motor driving circuit 100, a switching circuit 110, and a fan motor (which will be simply referred to as a "motor" hereafter) 120.

With the present embodiment, the motor 120 is a single-phase full-wave motor, and is disposed such that it faces an unshown target to be cooled. The coil current, i.e., the ON/OFF state of the motor 120, is controlled according to the switching signals Vsw1 and Vsw2 generated by the motor driving circuit 100 and the switching circuit 110, thereby controlling the rotation of the motor 120.

The switching circuit 110 includes a first high-side transistor MH1, a second high-side transistor MH2, a first low-side transistor ML1, and a second low-side transistor ML2, which form a so-called H-bridge circuit. The first high-side transistor MH1 and the first low-side transistor ML1 are serially connected to each other between a power supply terminal 112 and a grounded terminal GND, which form a transistor pair (which will be referred to as the "first transistor pair" hereafter). In the same way, the second high-side transistor MH2 and the second low-side transistor ML2 form a transistor pair (which will be referred to as the "second transistor pair" hereafter). With the present embodiment, each of the first high-side transistor MH1 and the second high-side transistor MH2 is a P-channel MOSFET (Metal Oxide Semiconductor Field Effect Transistor). On the other hand, each of the first low-side transistor ML1 and the second low-side transistor ML2 is an N-channel MOSFET.

With such an arrangement, ON/OFF control is performed in a reciprocal manner, i.e., a complementary manner, for the first high-side transistor MH1 and the first low side transistor ML1. The ON/OFF control is performed for the first high-side transistor MH1 and the first low-side transistor ML1 according to the first high-side driving signal SDHL and the first low-side driving signal SDL1 each of which is applied to the gate of the corresponding transistor.

The voltage at the node between the first high-side transistor MH1 and the first low-side transistor ML1 is applied as the first switching signal Vsw1 to one terminal of the coil of the motor 120. When the first high-side transistor MH1 is in the ON state, the first switching signal Vsw1 is set to the power supply voltage Vdd. In addition, when the first low-side transistor ML1 is in the ON state, the first switching signal Vsw1 is set to the grounded voltage (0 V).

The ON/OFF control is performed for the second high-side transistor MH2 and the second low-side transistor ML2 according to the second high-side driving signal SDH2 and the second low-side driving signal SDL2, each of which is applied to the gate of the corresponding transistor. The voltage at the node between these two transistors is applied to the other terminal of the motor 120. The first switching signal SW1 and the second switching signal SW2 are controlled such that they have phases that are the reverse of each other.

It should be noted that the four transistors which form the switching circuit 110 may be integrally formed, and may be provided as a built-in component of the motor driving circuit 100. Also, an anti-reverse diode may be provided between the sources of the first high-side transistor MH1 and the second high-side transistor MH2 and a power supply (not shown) that provides power supply voltage Vdd.

The motor driving circuit 100 generates pulse driving signals SDH1, SDH2, SDL1, and SDL2 (which will be collectively referred to as "driving signals SD" hereafter, as necessary). The pulse driving signals SDH1, SDH2, SDL1, and SDL2 thus generated are output to the respective transistors MH1, MH2, ML1, and ML2 of the switching circuit 110 connected to the coil of the motor 120 which is a target to be driven. With such an arrangement, ON/OFF control is performed for the transistors MH1, MH2, ML1, and ML2 of the switching circuit 110, thereby controlling the conduction period of the coil of the motor 120.

The motor driving circuit 100 receives, in the form of an external input signal, a rotation control voltage Vcnt, which has been set according to the torque target value for the motor 120. Also, the rotation control voltage Vcnt may be generated within the motor driving circuit 100. The motor driving circuit 100 generates, based upon the rotation control voltage Vcnt, the pulse-modulated driving signals SDH1, SDL1, SDH2, and SDL2, which determine the conduction period of the coil of the motor 120 that is a target to be driven. The driving signals SDH1, SDL1, SDH2, and SDL2 thus generated are output to the switching circuit 110, which is an output stage.

As shown in FIG. 1, the motor driving circuit 100 includes a driving signal generating circuit 10, a current detection circuit 20, and a current limiting circuit 30. The driving signal generating circuit 10 and the current limiting circuit 30 are integrally formed on a single semiconductor substrate in the form of a function IC 90.

First, description will be made regarding the outline of the configuration and function of the motor driving circuit 100 shown in FIG. 1.

The driving signal generating circuit 10 receives the rotation control signal Vcnt, which is an instruction to set the motor torque, and Hall signals VH+ and VH− output from unshown Hall elements. As described later, the driving signal generating circuit 10 generates, based upon the rotation control voltage Vcnt and the Hall signals VH+ and VH−, a pulse-modulated driving signal SD according to the target torque. The driving signal SD thus generated is output to the switching circuit 110.

The current detection circuit 20 detects a current (which will also be referred to as "coil current Icoil" hereafter) that flows through the coil of the motor 120. With the present embodiment, the current detection circuit 20 includes a detection resistor R10, which is provided on a path for the current Icoil that flows through the coil of the motor 120 via the switching circuit 110, and of which one terminal is set to a fixed electric potential. The current detection circuit 20 outputs a voltage drop across the detection resistor R10, as a detection voltage Vdet that corresponds to the current that flows through the coil of the motor 120. The detection voltage Vdet is a voltage that is proportional to the coil current Icoil, and is output to the current limiting circuit 30. It should be noted that the detection resistor R10 may be provided on the power supply terminal 112 side, instead of the grounded terminal side of the switching circuit 110. In order to reduce power consumption at the detection resistor R10, the resistance value of the detection resistor R10 is preferably set to be within a range from tens of mΩ to hundreds of mΩ.

The current limiting circuit 30 controls the logical values of the driving signals SD generated by the driving signal generating circuit 10 such that the coil current Icoil thus detected by the current detection circuit 20 does not exceed a predetermined current upper limit value Imax. The current limiting circuit 30 outputs a control signal S2 to the driving signal generating circuit 10. The current limiting circuit 30 controls the logical values of the driving signals SD via the control signal S2. Description will be made later regarding a specific example of the control signal S2 and the signal processing performed within the driving signal generating circuit 10.

The current limiting circuit 30 receives, as an input signal, a starting signal S1, which is an instruction to start the driving (rotation) of the motor 120. At the time of the starting operation executed according to an instruction, i.e., the starting signal S1, the current limiting circuit 30 increases the current upper limit Imax according to the time elapsed. After the starting operation of the motor 120, the current limiting circuit 30 sets the current upper limit Imax to a predetermined fixed value.

Figure 2A:
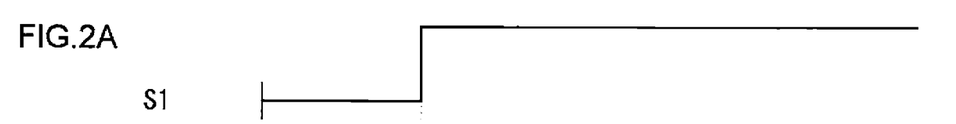
FIGS. 2A and 2B are time charts which show the operation state of the motor driving circuit shown in FIG. 1.
Figure 2B:
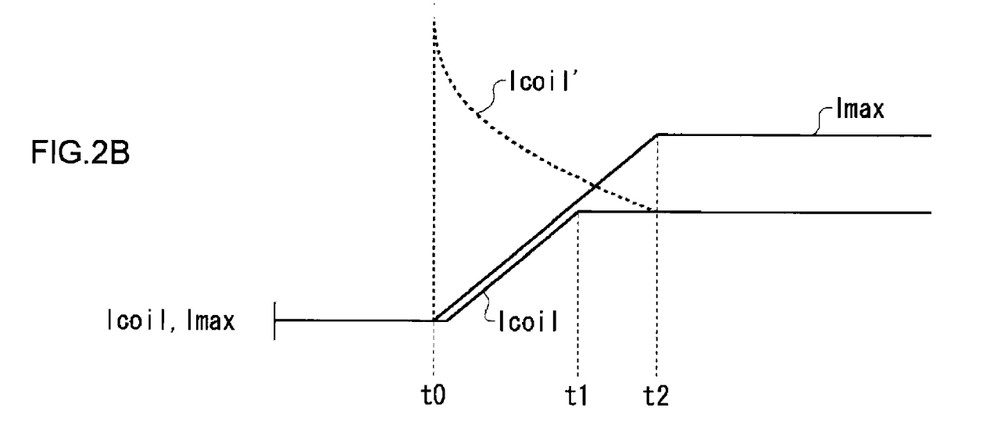

FIGS. 2A and 2B are time charts which show the operation state of the motor driving circuit 100 according to the present embodiment. In the time charts shown in FIGS. 2A and 2B in this specification, in order to simplify the description and facilitate understanding of the description, the vertical axis and the horizontal axis are expanded or reduced as appropriate.

As shown in FIG. 2A, at the point in time t0, the starting signal S1 is switched to the high-level state, which instructs the motor 120 to start. Upon the starting signal S1 being set to the high-level state, the driving signal generating circuit 10 generates pulse signals having a pulse width that corresponds to the torque target value. The pulse signals thus generated are output to the switching circuit 110 as the driving signals SD.

After the point in time t0 at which the starting signal S1 is switched to the high-level state, the current limiting circuit 30 increases the current upper limit Imax according to the time elapsed. After the current upper limit Imax has reached a predetermined value, the current limiting circuit 30 sets the current upper limit Imax to a predetermined fixed value.

Let us consider an arrangement in which the starting operation is performed for a motor that has stopped, without involving the operation of the current limiting circuit 30 which limits the coil current. With such an arrangement, in the starting operation, the switching voltages Vsw1 and Vsw2 are suddenly applied to the coil of the motor with a pulse width that corresponds to the torque target value. This leads to a rapid increase in the coil current that flows through the motor, as indicated by the broken line in FIG. 2B.

On the other hand, the current limiting circuit 30 controls the logical values of the driving signals SD such that the rapidly increased coil current Icoil does not exceed the current upper limit Imax. As described above, the current upper limit Imax is controlled such that it gradually increases according to the time elapsed after the point in time t0. Thus, in practice, the current Icoil that flows through the coil of the motor 120 gradually increases according to an increase in the current upper limit Imax, as indicated by the solid line in FIG. 2B.

After the point in time t1 at which the coil current Icoil that flows through the motor 120 has reached a current value that corresponds to the torque target value, the increase in the coil current Icoil stops. After the point in time t1, the current upper limit Imax continues to be gradually increased. Subsequently, after the point in time t2 at which the current upper limit Imax has reached a predetermined value, the current upper limit Imax is set to a fixed value. This ensures that the coil current Icoil is limited to the predetermined value or less even if something causes an increase in the coil current Icoil, thereby protecting the circuit.

With the motor driving circuit 100 having such a configuration, the coil current Icoil that flows through the coil of the motor 120 is limited to the current upper limit Imax or less. In the starting operation, the current upper limit Imax is gradually increased. This gradually increases the coil current Icoil, which flows through the coil of the motor, with the current upper limit value Imax as the upper limit, thereby providing soft start control.

Next, detailed description will be made regarding an example of a configuration of each circuit block of the motor driving circuit 100 according to the present embodiment.

Figure 3:
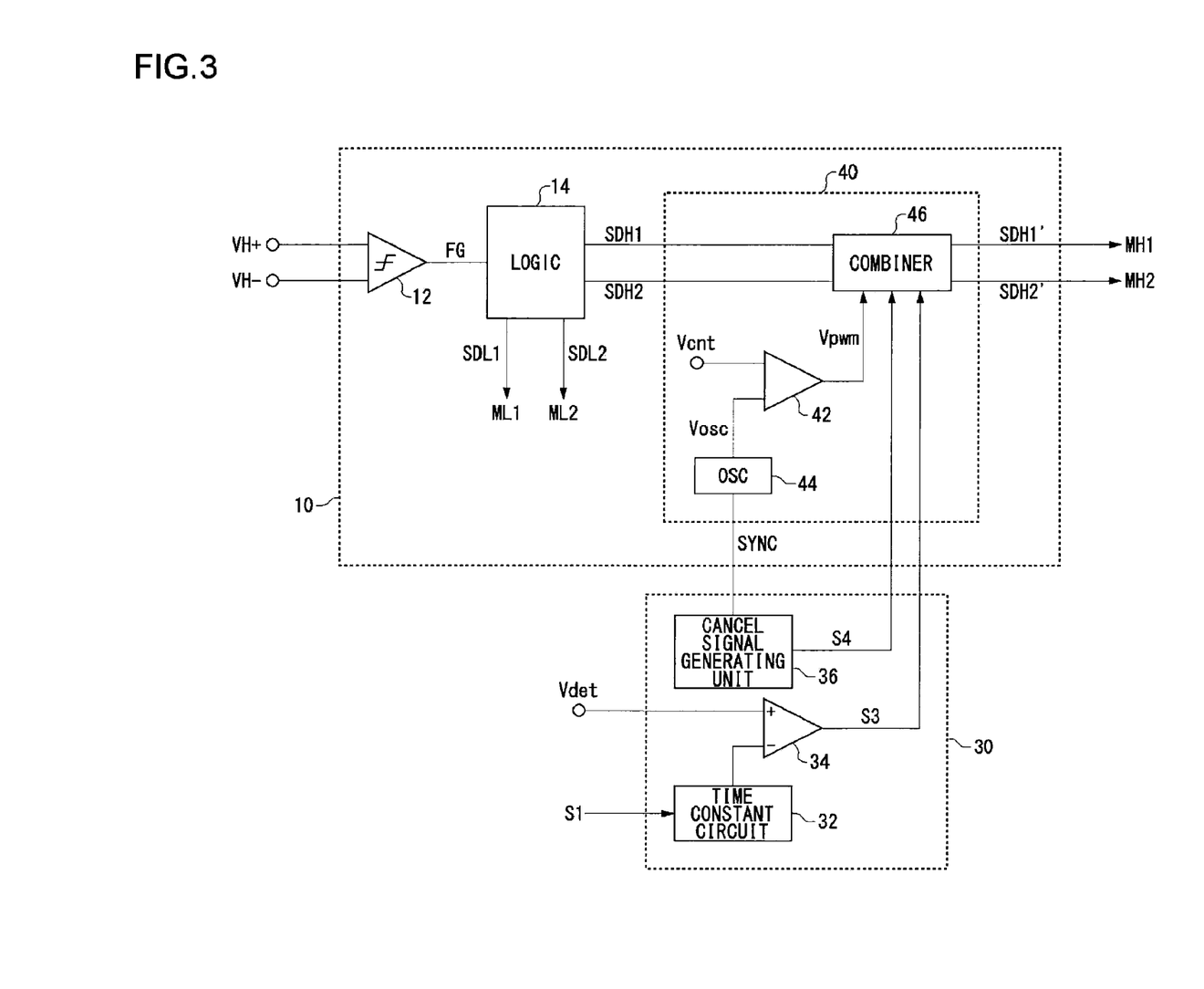
FIG. 3 is a circuit diagram which shows an example of a configuration of the motor driving circuit shown in FIG. 1.

FIG. 3 is a detailed circuit diagram which shows an example of a configuration of the motor driving circuit 100 shown in FIG. 1. In the following description, components identical or equivalent to those shown in FIG. 1 are denoted by the same reference numerals, and description thereof will be omitted as appropriate.

The driving signal generating circuit 10 includes a comparator 12, a logic circuit 14, and a pulse width modulator 40. The comparator 12 makes a comparison between the Hall signals VH+ and VH– output from the unshown Hall elements, and generates a frequency generating signal (which will be referred to as the "FGsignal" hereafter), which switches between the high-level state and the low-level state according to the positional (phase) relation between the rotor and the stator of the motor 120.

The logic circuit 14 generates the driving signals SDH1, SDH2, SDL1, and SDL2 based upon the FG signal output from the comparator 12. With the present embodiment, the motor driving circuit 100 controls the conduction period of the motor 120 using a pulse width modulation method. With the pulse width modulation method employed in the present embodiment, the motor driving control is performed as follows. That is to say, the low-side transistors ML1 and ML2 are alternately switched between the ON state and the OFF state according to the phase switching of the motor 120. Furthermore, switching control is performed for the high-side transistors MH1 and MH2 according to the pulse-width modulated signals. Note that the present invention is not restricted to such an arrangement. Also, an arrangement may be made in which the low-side transistors are driven according to the pulse-width modulated signals. Also, an arrangement may be made in which both the high-side transistors and the low-side transistors are driven according to the pulse-width modulated signals.

For example, when the FG signal is in the high-level state, the logic circuit 14 generates the driving signals SD so as to set the first high-side transistor MH1 and the second low-side transistor ML2 to the ON state, and so as to set the second high-side transistor MH2 and the first low-side transistor ML1 to the OFF state. In this step, a delay, i.e., dead time, is preferably provided to the signal switching operation, in order to prevent the first high-side transistor MH1 and the first low-side transistor ML1 from being in the ON state at the same time, and in order to prevent the second high-side transistor MH2 and the second low-side transistor ML2 from being in the ON state at the same time.

The driving signals SDL1 and SDL2 output from the logic circuit 14 are output to the low-side transistors, i.e., the first low-side transistor ML1 and the second low-side transistor ML2, respectively. As a result, the first low-side transistor ML1 and the second low-side transistor ML2 are alternately switched between the ON state and OFF state according to whether the state of the FG signal is in the high-level state or the low-level state.

On the other hand, the driving signals SDH1 and SDH2 output from the logic circuit 14 are output to the pulse width modulator 40. The pulse width modulator 40 generates a pulse width modulation signal (which will be referred to as the "PWM signal" hereafter) Vpwm having a pulse width that corresponds to the torque target value for the motor 120. Furthermore, the pulse width modulator 40 combines the Vpwm and each of the driving signals SDH1 and SDH2 by logical operation.

The pulse width modulator 40 includes a PWM comparator 42, an oscillator 44, and a combining unit 46. The oscillator 44 generates a triangle wave or sawtooth wave cyclic voltage Vosc having a predetermined frequency. The PWM comparator 42 compares the rotation control voltage Vcnt with the frequency voltage Vosc so as to generate the PWM signal Vpwm. Specifically, the rotation control voltage Vcnt is input to the non-inverted input terminal of the PWM comparator 42. On the other hand, the frequency voltage Vosc is input to the inverted input terminal thereof. As a result, in a case that Vcnt is greater than Vosc, the PWM signal Vpwm is in the high-level state. On the other hand, in a case that Vcnt is smaller than Vosc, the PWM signal Vpwm is in the low-level state. The period in which the PWM signal Vpwm is in the high-level state, which increases according to an increase in the control voltage Vcnt, corresponds to the conduction period of the motor. The combining unit 46 combines, by logical operation, the PWM signal Vpwm and each of the driving signals SDH1 and SDH2 generated by the logic circuit 14. The signals thus combined are output to the first high-side transistor MH1 and the second high-side transistor MH2. The driving signals SDH1' and SDH2' thus output from the combining unit 46 are pulse-width modulation signals, the widths of which are adjusted according to the torque.

Next, description will be made regarding a configuration of the current limiting circuit 30. The current limiting circuit 30 includes a time constant circuit 32, a comparator 34, and a release signal generating unit 36.

Upon the starting signal S1 switching to the high-level state when the motor 120 is started, the time constant circuit 32 generates a soft start voltage, the voltage value of which is increased according to the time elapsed. The soft start voltage thus generated corresponds to the upper limit voltage Vmax, which is set according to the current upper limit Imax set by the current limiting circuit 30.

The time constant circuit 32 may have various configurations, examples of which include a configuration type in which a capacitor is charged with a constant current, a configuration type in which a ramp wave digital signal or the output signal of a counter circuit is digital/analog converted, etc. The circuit configuration thereof is not restricted in particular.

The current limiting circuit 30 compares the detection voltage Vdet output from the current detection circuit 20 with the upper limit voltage Vmax which is set according to the current upper limit Imax. Specifically, the current limiting circuit 30 adjusts the driving signals SDH1 and SDH2 such that the detection voltage Vdet does not exceed the upper limit voltage Vmax. The comparator 34 makes a comparison between the detection voltage Vdet and the upper limit voltage Vmax output from the time constant circuit 32. In a case that Vdet is greater than Vmax, the comparator 34 outputs the high-level state output signal. On the other hand, in a case that Vdet is smaller than Vmax, the comparator 34 outputs the low-level state output signal. The output signal (which will be referred to as the "comparison signal S3" hereafter) of the comparator 34 is output to the driving signal generating circuit 10. The comparison signal S3 and a release signal S4 described later correspond to the control signal S2 shown in FIG. 1.

In a case that the comparison signal S3 switches to the high-level state, the current limiting circuit 30 fixes the logical value of the driving signals SD, which are generated by the driving signal generating circuit 10, so as to instruct the switching circuit 110 to stop the supply of current to the motor 120. Subsequently, the current limiting circuit 30 releases the fixed logical value at a predetermined timing.

With the present embodiment, in a case that the comparison signal S3 switches to the high-level state, the current limiting circuit 30 sets the logical values of the first high-side driving signal SDH1 and the second high-side driving signal SDH2 to fixed values so as to forcibly turn off the first high-side transistor MH1 and the second high-side transistor MH2, thus stopping the supply of current to the motor 120. Specifically, upon reception of such a comparison signal S3, the combining unit 46 sets the logical values of the first high-side driving signal SDH1 and the second high-side driving signal SDH2 to fixed values.

It should be noted that the present invention is not restricted to such an arrangement. Also, an arrangement may be made in which, in such a case, the logical values of the first low-side driving signal SDL1 and the second low-side driving signal SDL2 are set to fixed values so as to turn off the first low-side transistor ML1 and the second low-side transistor ML2. Also, an arrangement may be made in which, in such a case, all the driving signals SD are set to fixed values so as to turn off all the transistors that form the switching circuit 110.

Subsequently, the combining unit 46 releases the fixed logical values of the first high-side driving signal SDH1 and the second high-side driving signal SDH2 at a predetermined timing. With the present embodiment, each logical value is released according to the release signal S4 generated by the release signal generating unit 36.

The release signal generating unit 36 of the current limiting circuit 30 preferably has a configuration which generates the release signal S4 such that the release signal S4 switches to a predetermined level (the high level in the present embodiment) every predetermined period. The combining unit 46 monitors the release signal S4, and release the first high-side driving signal SDH1 and the second high-side driving signal SDH2 from the fixed logical values every time the release signal S4 switches to the high-level state. Such control can be easily provided by employing a latch circuit or a flip-flop circuit that receives the comparison signal S3 and the release signal S4 as input signals.

With such an arrangement, the release signal generating unit 36 preferably generates the release signal S4 synchronously with the driving signals SD generated by the driving signal generating circuit 10. For example, the release signal generating unit 36 may generate the release signal S4, which switches to the high-level state every time the cycle voltage Vosc generated by the oscillator 44 reaches its peak voltage or its bottom voltage.

With the motor driving circuit 100 having such a configuration shown in FIG. 3, in a case that the coil current Icoil reaches the current upper limit Imax, the transistors of the switching circuit 110 are switched to the OFF state, and are maintained in the OFF state, which stops the supply of current to the coil of the motor 120 until the fixed logical values are released at a predetermined timing. This prevents the coil current Icoil from increasing beyond the current upper limit Imax.

Also, an arrangement may be made in which the fixed logical value is released at a timing with a predetermined delay after the comparison signal S3 switches to the high-level state. With such an arrangement, a timer circuit or a one-shot circuit may be employed, which has a function of timing a period according to the comparison signal S3.

With the motor driving circuit 100 shown in FIG. 3, the upper limit voltage Vmax is gradually increased by the time constant circuit 32, which increases the current upper limit Imax according to the time elapsed. Such an arrangement properly provide the soft start operation described with reference to FIGS. 2A and 2B.

Furthermore, with an arrangement in which the motor 120 is pulse driven (PWM driven), spike noise can occur in the current flowing through the coil of the motor 120 at a timing at which the transistors switch according to the driving signals SD. In some cases, such noise leads to the detection voltage Vdet exceeding the upper limit voltage Vmax, which leads to a problem of erroneous detection of the over current state. With the motor driving circuit 100 according to the present embodiment, the fixed logical values of the driving signals SD which have been thus temporarily set in the over current state are released according to the release signal S4, which is generated synchronously with the driving signals SD. Such an arrangement suppresses the influence of such spike noise on the rotation operation of the motor 120.

The above-described embodiments have been described for exemplary purposes only, and are by no means intended to be interpreted restrictively. Rather, it can be readily conceived by those skilled in this art that various modifications may be made by making various combinations of the aforementioned components or processes, which are also encompassed in the technical scope of the present invention.

Description has been made in the embodiments regarding an arrangement in which, of the motor driving circuit 100, the driving signal generating circuit 10 and the current limiting circuit 30 are integrally formed in the form of a single LSI. However, the present invention is not restricted to such an arrangement. Also, such an LSI may further include the current detection circuit 20. Also, the transistors that are the components of the switching circuit 110 may be integrally formed. For example, the switching circuit 110 may comprise discrete power transistors. Also, the switching circuit 110 may be provided in the form of a built-in component of the motor driving circuit 100. Alternatively, a part of the components of the function IC 90 may be provided in the form of discrete elements or chip components external to an LSI. Also, such a part of the components of the function IC 90 may be provided in the form of multiple LSIs.

Also, with regard to the transistors employed in the embodiments, bipolar transistors and FETs are interchangeable, and P-channel transistors and N-channel transistors are also interchangeable.

Description has been made in the embodiments regarding an arrangement in which pulse width modulation is performed, which is a kind of pulse modulation in which the pulse width is controlled. Also, the present invention can be applied to a motor driving circuit employing other kinds of pulse modulation, e.g., pulse frequency modulation (PFM) etc.

Description has been made in the embodiments regarding an arrangement in which a single-phase motor is driven. However, the present invention is not restricted to such an arrangement. That is to say, the present invention may also be applied to a motor driving circuit which drives a three-phase motor or the like.

Description has been made in the embodiments regarding an arrangement in which the motor driving circuit 100 drives a fan motor. However, the motor which is to be driven by the motor driving circuit according to the present invention is not restricted to such a fan motor. The present invention can be widely applied to other types of single-phase and multi-phase motors.

The settings of the logical values of the signals in the circuit, such as the high-level state and the low-level state of the signals, have been described in the embodiments for exemplary purposes only. The settings can be freely modified by inverting the signals using inverters or the like. In this case, as can be readily conceived by those skilled in this art, the AND gates and the OR gates should be exchanged.

While the preferred embodiments of the present invention have been described using specific terms, such description is for illustrative purposes only, and it is to be understood that changes and variations may be made without departing from the spirit or scope of the appended claims.

What is claimed is:

1. A motor driving circuit, which generates pulse driving signals so as to control the ON/OFF state of a switching circuit connected to a coil of a motor to be driven, thereby controlling the conduction period of said motor, comprising:
    a driving signal generating circuit which generates the driving signals such that they are pulse modulated according to a torque target value for said motor, and which outputs the driving signals thus generated to said switching circuit;
    a current detection circuit which detects a current flowing through said coil of said motor; and
    a current limiting circuit which controls the logical values of the driving signals generated by said driving signal generating circuit such that a current detected by said current detection circuit does not exceed a predetermined current upper limit,
    wherein said current limiting circuit increases the current upper limit according to the time elapsed in the starting operation of said motor,
    wherein said current limiting circuit includes a detection resistor, one terminal of which is set to a fixed electric potential, the detection resistor being provided on a path for the current that flows through the coil of said motor and said switching circuit; and outputs a voltage drop across said detection resistor as a detection voltage that corresponds to the current flowing through the coil of said motor;
    wherein said current limiting circuit compares the detection voltage with an upper limit voltage which is set according to the current upper limit, controls the logical values of the driving signals such that the detection voltage does not exceed the upper limit voltage, and increases the upper limit voltage in the starting operation of said motor;
    wherein said current limiting circuit includes a comparator which compares the detection voltage with the upper limit voltage,
    and wherein, in a case that the detection voltage exceeds the upper limit voltage, each of the logical values of the driving signals generated by said driving signal generating circuit is set to a fixed value so as to instruct said switching circuit to stop the supply of current to said motor, following which the fixed logical values thus set are released at a predetermined timing.

2. A motor driving circuit according to claim 1, wherein said current limiting circuit sets the current upper limit to a predetermined fixed value after the starting operation of said motor.

3. A motor driving circuit according to claim 1, wherein said current limiting circuit further includes a release signal generating unit which generates a release signal that is set to a predetermined level, synchronously with the driving signals generated by said driving signal generating circuit,
    and wherein, in a case that the release signal generated by said release signal generating unit switches to the aforementioned predetermined level, the fixed logical values of the driving signals are released.

4. A motor driving circuit according to claim 1, which is integrally formed on a single semiconductor substrate.

5. A cooling apparatus including:
    a fan motor; and
    a motor driving circuit which drives said fan motor and which generates pulse driving signal so as to control the ON/OFF state of a switching circuit connected to a coil of the fan motor, thereby controlling the conduction period of said fan motor, the motor drive circuit comprising:
        a driving signal generating circuit which generates the driving signals such that they are pulse modulated according to a torque target value for said motor, and which outputs the driving signals thus generated to said switching circuit;
        a current detection circuit which detects a current flowing through said coil of said motor; and
        a current limiting circuit which controls the logical values of the driving signals generated by said driving signal generating circuit such that a current detected by said current detection circuit does not exceed a predetermined current upper limit,
        wherein said current limiting circuit increases the current upper limit according to the time elapsed in the starting operation of said motor,
        wherein said current limiting circuit includes a detection resistor, one terminal of which is set to a fixed electric potential, the detection resistor being provided on a path for the current that flows through the coil of said motor and said switching circuit; and outputs a voltage drop across said detection resistor as a detection voltage that corresponds to the current flowing through the coil of said motor;

wherein said current limiting circuit compares the detection voltage with an upper limit voltage which is set according to the current upper limit, controls the logical values of the driving signals such that the detection voltage does not exceed the upper limit voltage, and increases the upper limit voltage in the starting operation of said motor;

wherein said current limiting circuit includes a comparator which compares the detection voltage with the upper limit voltage, and wherein, in a case that the detection voltage exceeds the upper limit voltage, each of the logical values of the driving signals generated by said driving signal generating circuit is set to a fixed value so as to instruct said switching circuit to stop the supply of current to said motor, following which the fixed logical values thus set are released at a predetermined timing.

* * * * *